United States Patent [19]
Romanelli

[11] Patent Number: 5,904,130
[45] Date of Patent: May 18, 1999

[54] GASEOUS FUEL INJECTION SYSTEM

[75] Inventor: Patrick Romanelli, Harrington, N.J.

[73] Assignee: Pacer Industries, Inc., Pensacola, Fla.

[21] Appl. No.: 08/851,775

[22] Filed: May 6, 1997

[51] Int. Cl.$^6$ ................................................. F02M 21/04
[52] U.S. Cl. ........................... 123/527; 261/50.1; 261/59; 261/DIG. 39
[58] Field of Search ............................... 123/527; 48/116, 48/117, 144; 261/50.1, 50.2, 58, 59, DIG. 39

[56] References Cited

U.S. PATENT DOCUMENTS

| | | | |
|---|---|---|---|
| 2,255,296 | 9/1941 | Moseley | 261/DIG. 39 |
| 2,495,485 | 1/1950 | Schwindler | 261/50.1 |
| 2,902,988 | 9/1959 | Rippingille . | |
| 2,921,570 | 1/1960 | Szlachcic et al. | 261/527 |
| 3,640,512 | 2/1972 | Morgenroth | 261/50.1 |
| 3,651,794 | 3/1972 | Douglas . | |
| 3,710,770 | 1/1973 | Newkirk et al. . | |
| 4,089,914 | 5/1978 | Yoshioka et al. | 261/DIG. 39 |
| 4,205,024 | 5/1980 | Hirosawa | 261/DIG. 39 |
| 4,433,664 | 2/1984 | Rodrigues . | |
| 4,721,078 | 1/1988 | Watanabe et al. . | |
| 4,997,458 | 3/1991 | Jones | 123/527 |
| 5,377,646 | 1/1995 | Chasteen . | |
| 5,381,660 | 1/1995 | Loving et al. . | |
| 5,557,934 | 9/1996 | Beach . | |

*Primary Examiner*—John T. Kwon
*Attorney, Agent, or Firm*—St.Onge Steward Johnston & Reens LLC

[57] ABSTRACT

A gaseous fuel injection system for use with a combustion engine having a throttle cable. The system include a supply tank connected to a pressure regulator connected to a throttle assembly, and a safety valve preventing fuel flow when the engine is not operating. The throttle assembly includes a tubular throttle body having opposing open ends, with one end securable to an intake manifold of the engine. A control rod extends transversely through the throttle body, and an air intake valve is secured to the control rod within the throttle body, so that rotating the control rod controls air intake into the intake manifold. A fuel valve is attached to the throttle body and includes a valve body defining a fuel outlet connected to a fuel injector extending into the throttle body. The fuel valve also includes a needle closing the fuel outlet and extending out of the valve body. A control arm has a first end pivotally secured to the throttle body and a second end secured to the needle, and a cam is secured to a second end of the control rod extending out of the throttle body and is in contact with the control arm. Rotating the control rod, therefore, pulls the needle out of the fuel outlet and controls fuel flow into the intake manifold. A throttle wheel is secured to a first end of the control rod and is adapted to receive the throttle cable, whereby the throttle cable controls both air intake and fuel flow.

15 Claims, 4 Drawing Sheets

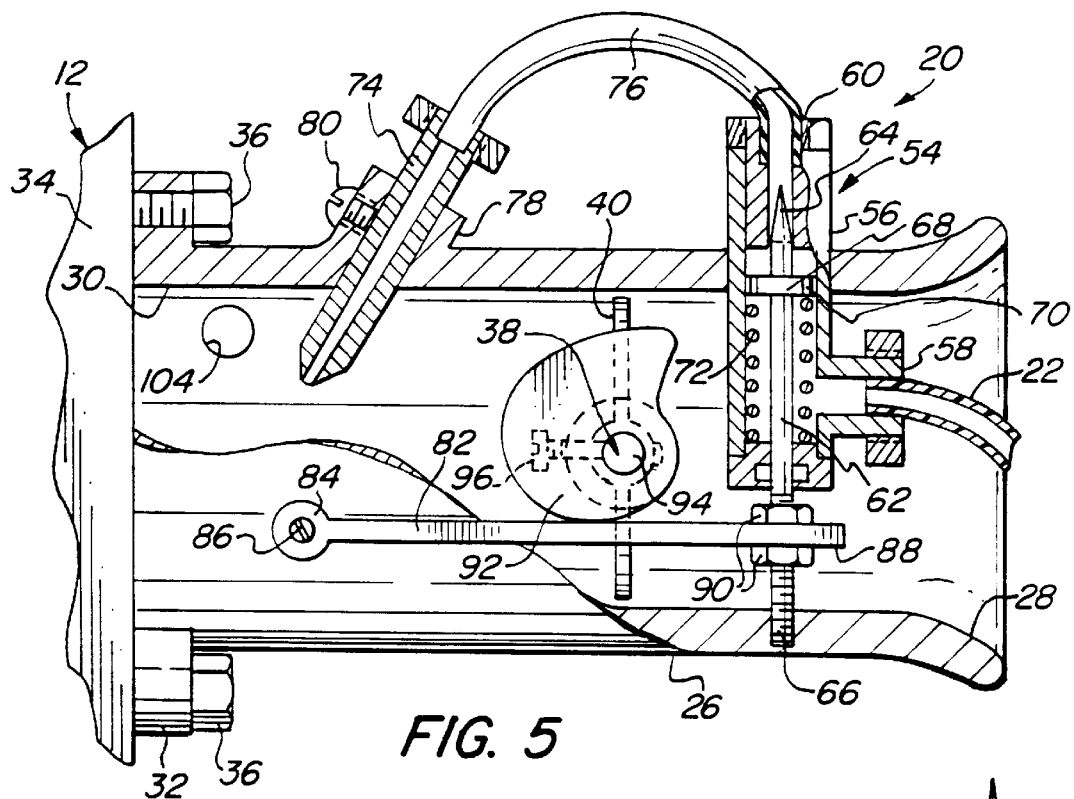
FIG. 5
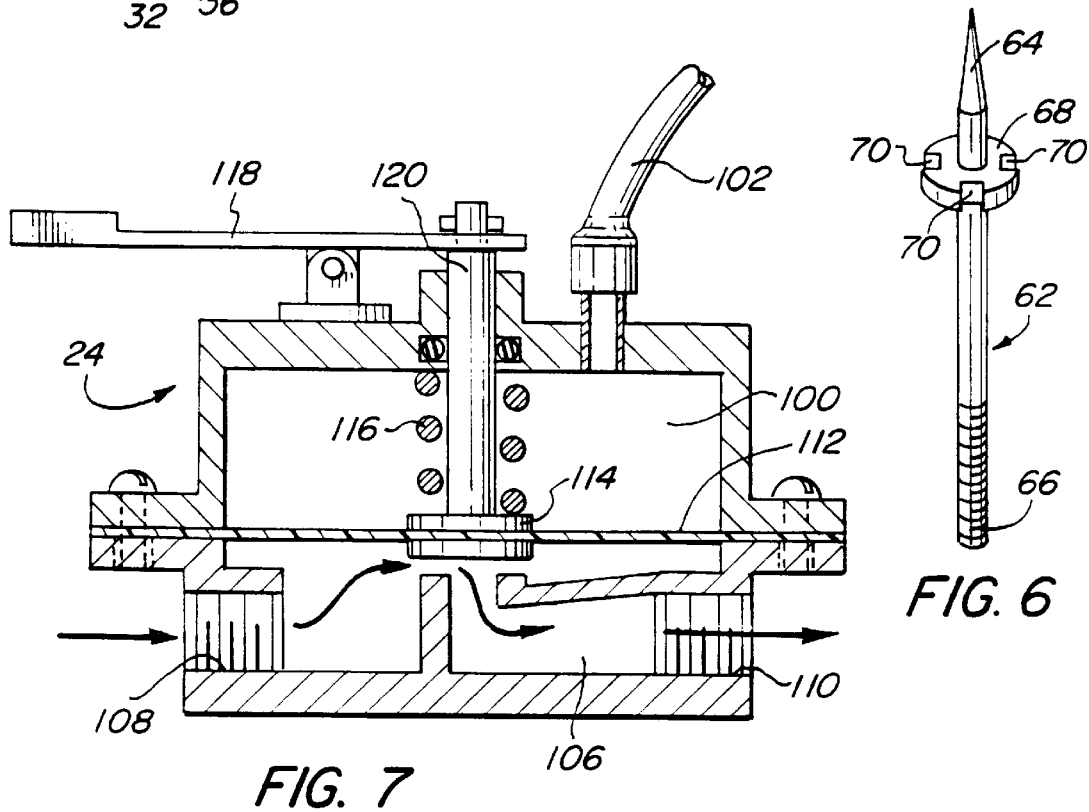
FIG. 6
FIG. 7

GASEOUS FUEL INJECTION SYSTEM

FIELD OF THE INVENTION

The present invention relates to an internal combustion engine and, more particularly, to a gaseous fuel injection system for use with an internal combustion engine. Even more particularly, the invention relates to a throttle assembly for use as part of a gaseous fuel injection system.

BACKGROUND OF THE INVENTION

Small, gasoline-fueled internal combustion engines, such as those found on golf carts, lawn mowers, snow blowers, chain saws and other, similar outdoor equipment are usually simple and inexpensive. Many of these engines, for example, include a common gasoline carburetor controlled by a throttle cable that directly controls both air and fuel intake through the carburetor. In order to remain inexpensive, however, these simple gasoline-fueled internal combustion engines do not include emission controlling features and are, therefore, a great source of atmospheric pollutants.

In response to the surprisingly large amount of pollutants produced by these small engines, the Environmental Protection Agency has recently issued new regulations requiring small engines to comply with the 1990 Clean Air Act. Small engine manufacturers, accordingly, are scrambling for simple and inexpensive modifications that will allow their engines to meet these new, more stringent emission requirements.

One solution for providing small engines that meet the new emission requirements is to convert them from gasoline burning engines to cleaner gaseous fuel, such a natural gas or butane, burning engines. Preferably, a gaseous fuel injection system is provided as a direct replacement for the gasoline carburetor.

Gaseous fuel injection systems, of course, are known as illustrated by the following patents. However, none of the following patents, alone or in combination, disclose a gaseous fuel injection system providing a direct replacement for a gasoline carburetor controlled by a throttle cable that directly controls both air and fuel intake.

U.S. Pat. No. 4,433,664 to Rodrigues, for example, discloses a fuel system utilizing gaseous fuel. The system includes a fuel supply tank connected to a feeder gasket by a discharge line controlled by a pressure regulator. The pressure regulator regulates the flow of fuel to the feeder gasket, which is secured between a carburetor and an intake manifold. A vacuum control, connected to the intake manifold by a tube, controls the pressure regulator and is in-turn controlled by the strength of a vacuum created within the intake manifold. The air intake of the carburetor is controlled by an accelerator pedal, and an operator can alter the vacuum in the intake manifold, and therefore indirectly control the fuel consumption, by pressing on the pedal to increase the air intake into the carburetor.

U.S. Pat. No. 3,651,794 to Douglas discloses an accelerator control system for gaseous fuel. The system includes a fuel supply tank connected to a fuel intake manifold by a fuel line controlled by a pressure regulator. The pressure regulator is directly connected to an accelerator pedal and controls fuel flow into the fuel intake manifold. The fuel intake manifold includes flow circuits leading to injection passageways connected to each cylinder of the engine, with each flow circuit having a manually adjusted restriction valve for effecting equal flow to all cylinders.

U.S. Pat. No. 5,377,646 to Chasteen discloses a gaseous fuel delivery system. The system includes a fuel delivery bar positioned across an air intake tube leading to a manifold of an engine. The fuel delivery bar has a plurality of fuel delivery orifices for dispersing fuel into the air intake tube, and is positioned above a butterfly valve controlling air intake. Fuel is metered to the fuel delivery bar by a valve cone controlled by a sensor monitoring oxygen in the exhaust gases. The butterfly valve is operated by a throttle to directly control the amount of oxygen entering the air intake tube and exiting in the exhaust, so that the throttle indirectly controls fuel flow.

U.S. Pat. No. 3,710,770 to Newkirk et al. discloses a fuel system for gaseous fuel. A circular manifold is positioned in a carburetor of an engine for dispersing fuel through a plurality of check valves in the manifold. A pressure regulator is controlled by an operator to act as a throttle to control fuel flow, and is also connected to a butterfly valve in the manifold to control air intake. It is not disclosed how the pressure regulator is controlled by the operator, or connected to the air intake valve.

Accordingly, what is desired is a gaseous fuel injection system that will provide a direct replacement for a gasoline carburetor, accommodate a throttle cable normally connected to the gasoline carburetor and allow the throttle cable to directly control both air and fuel intake into the engine. Such a gaseous fuel injection system will allow an internal combustion engine to be easily converted to operate on a gaseous fuel such as natural gas or butane, for example.

SUMMARY OF THE INVENTION

A general object, therefore, of the present invention is to provide an improved internal combustion engine having reduced emissions and enhanced performance.

A more particular object of the present invention is to provide an improved gaseous fuel injection system for use with an internal combustion engine.

Another object of the present invention is to provide a gaseous fuel injection system providing a direct replacement for a gasoline carburetor of an internal combustion engine.

A further object of the present invention is to provide a gaseous fuel injection system accommodating a throttle cable normally connected to the gasoline carburetor and allowing the throttle cable to directly control both air and fuel intake into the engine.

These and other objects of the present invention are achieved by a gaseous fuel throttle assembly for use as part of a combustion engine having an intake manifold. The throttle assembly includes a generally elongated, tubular throttle body having opposing open ends, with one of the opposing open ends securable to the intake manifold of the engine. An air intake valve controls air intake through the throttle body and into the intake manifold of the engine, and a fuel valve controls gaseous fuel flow into the throttle body. The throttle assembly also includes a throttle wheel controlling both the air intake valve and the fuel valve and adapted to receive a throttle cable, whereby the throttle cable will directly control both air intake and gaseous fuel flow into the intake manifold of the engine.

According to one aspect of the present invention, the air intake valve is positioned within the throttle body for controlling air intake through the throttle body and into the intake manifold of the engine. The throttle assembly also includes a fuel injector extending into the throttle body below the air intake valve, with the fuel valve controlling gaseous fuel flow to the fuel injector.

According to another aspect of the present invention, the throttle assembly further includes a rotatable control rod extending transversely through the throttle body. The throttle wheel is secured to a first end of the control rod extending out of the throttle body, the air intake valve is secured to the control rod within the throttle body, and a second end of the control rod extends out of the throttle body and controls the fuel valve.

According to an additional aspect of the present invention, the fuel valve includes a valve body defining a fuel inlet for connection to a fuel line and a fuel outlet connected to the fuel injector. A needle is positioned within the valve body and has a tapered end biased into and closing the fuel outlet, and an exposed end extending out of the valve body. The throttle assembly further includes a control arm having a first end pivotally secured to an outer surface of the throttle body and a second end attached to the exposed end of the needle. A cam is secured to the second end of the control rod, and is in contact with the control arm. Whereby, when the control rod is rotated to open the air intake valve, the cam will also rotate to push the control arm away from the valve body and gradually pull the tapered end of the biased needle out of the fuel outlet of the valve body to allow gaseous fuel to pass to the fuel injector.

According to a further aspect of the present invention, the throttle assembly additionally includes the throttle cable secured to the throttle wheel.

The present invention also provides a gaseous fuel injection system including the throttle assembly described above. The system includes a supply tank for holding compressed gaseous fuel, and a pressure regulator for regulating the pressure of the gaseous fuel from the supply tank. The pressure regulator is connected to the fuel valve of the throttle assembly.

According to an aspect of the present invention, the gaseous fuel injection system further includes a safety valve preventing gaseous fuel flow between the pressure regulator and the fuel valve of the throttle assembly when the combustion engine is not operating.

The present invention additionally provides an improved gaseous-fueled internal combustion engine having an intake manifold and a throttle cable controllable by an operator of the engine. The improvement comprises the gaseous fuel injection system described above.

The invention and its particular features and advantages will become more apparent from the following detailed description considered with reference to the accompanying drawings.

BRIEF DESCRIPTION OF THE DRAWINGS

FIG. 5 is a side elevational view, partially cut away, of the throttle assembly

FIG. 6 is a side perspective view of a needle of the throttle assembly of FIGS. 3–5; and FIG. 7 is a sectional view of a safety valve of the gaseous fuel injection system of FIGS. 1 and 2.

DETAILED DESCRIPTION OF THE INVENTION

Figure 1:
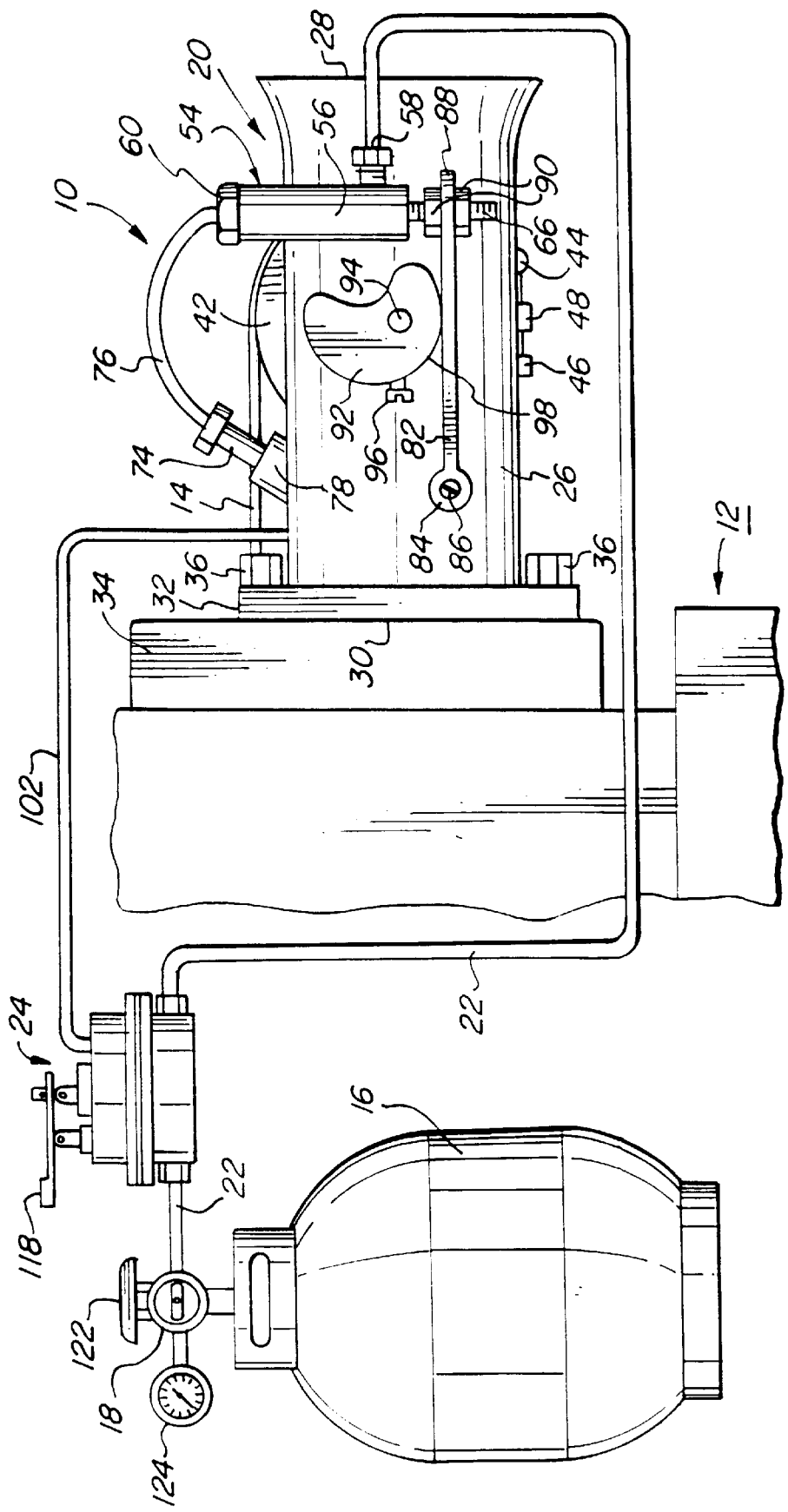
FIG. 1 is a partial side elevational view of an improved internal combustion engine including a gaseous fuel injection system according to the present invention.
Figure 2:
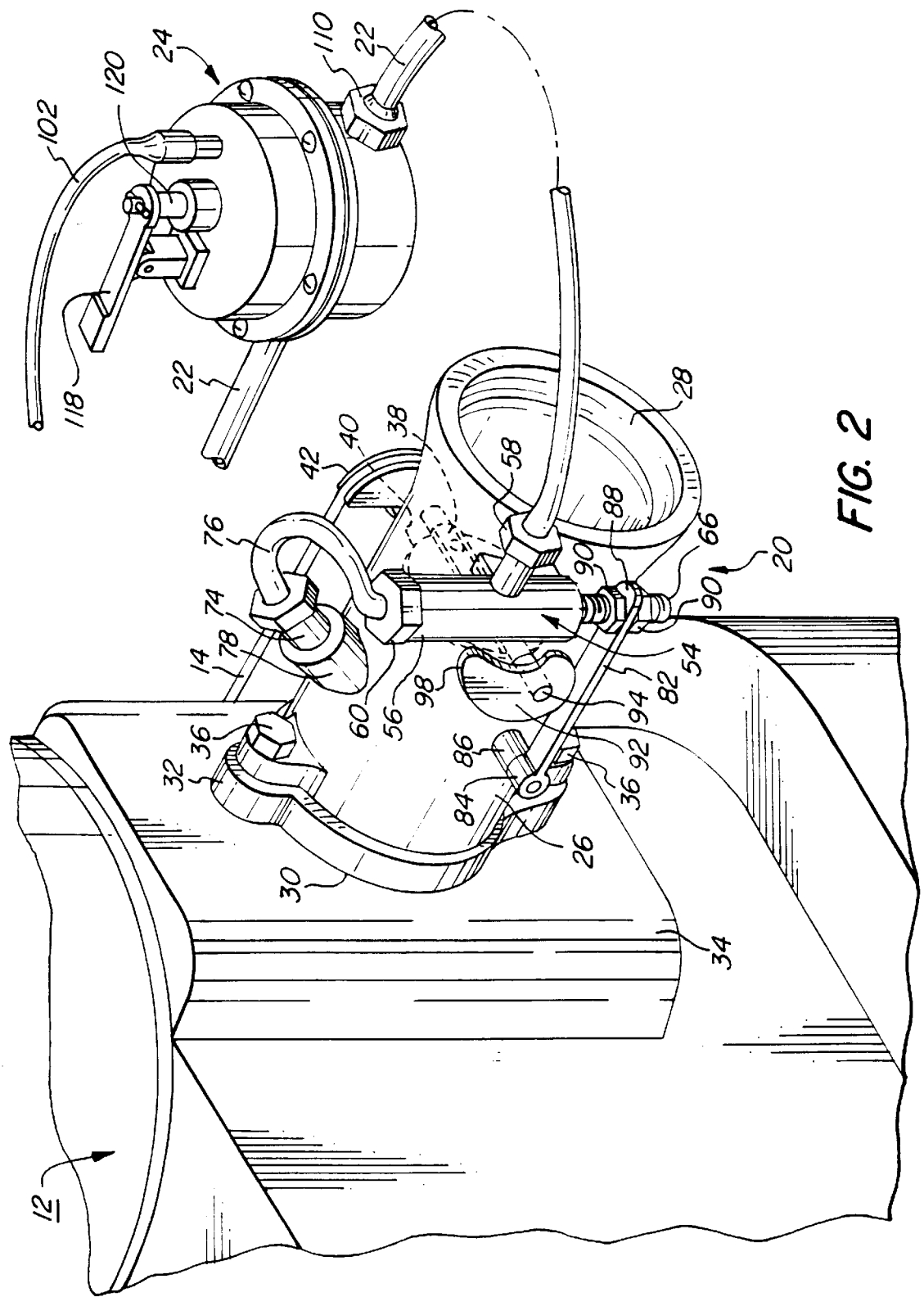
FIG. 2 is a partial front perspective view of the internal combustion engine of FIG. 1.
Figure 3:
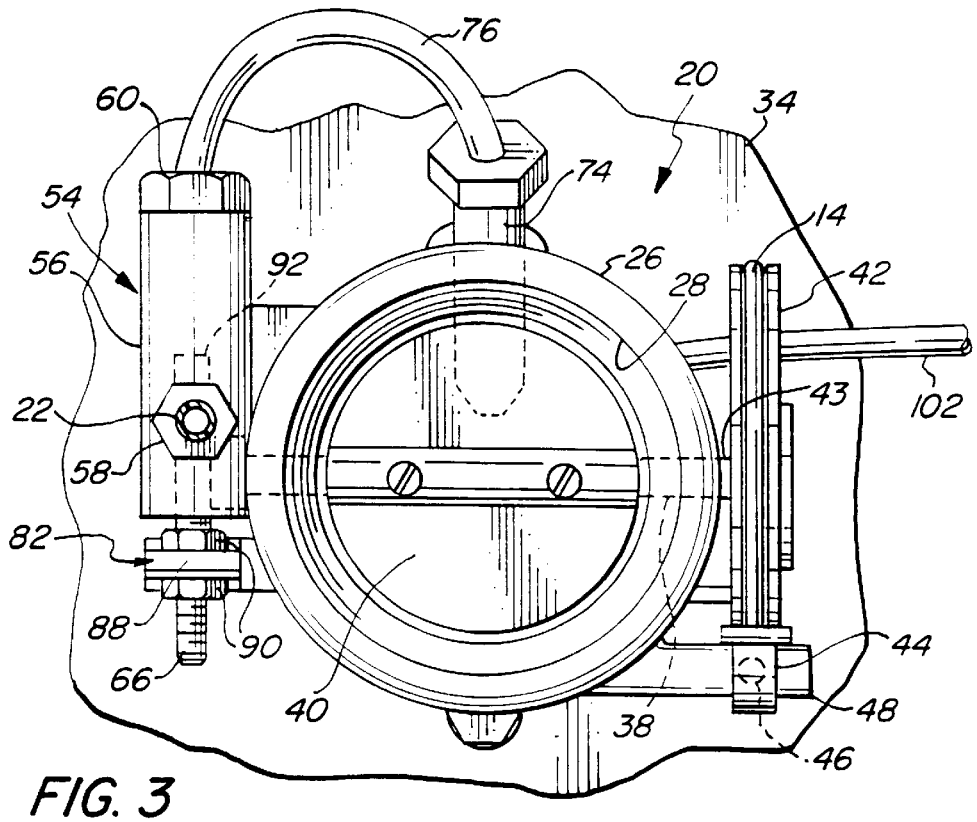
FIG. 3 is a front elevational view of a throttle assembly of the gaseous fuel injection system of FIGS. 1 and 2.
Figure 4:
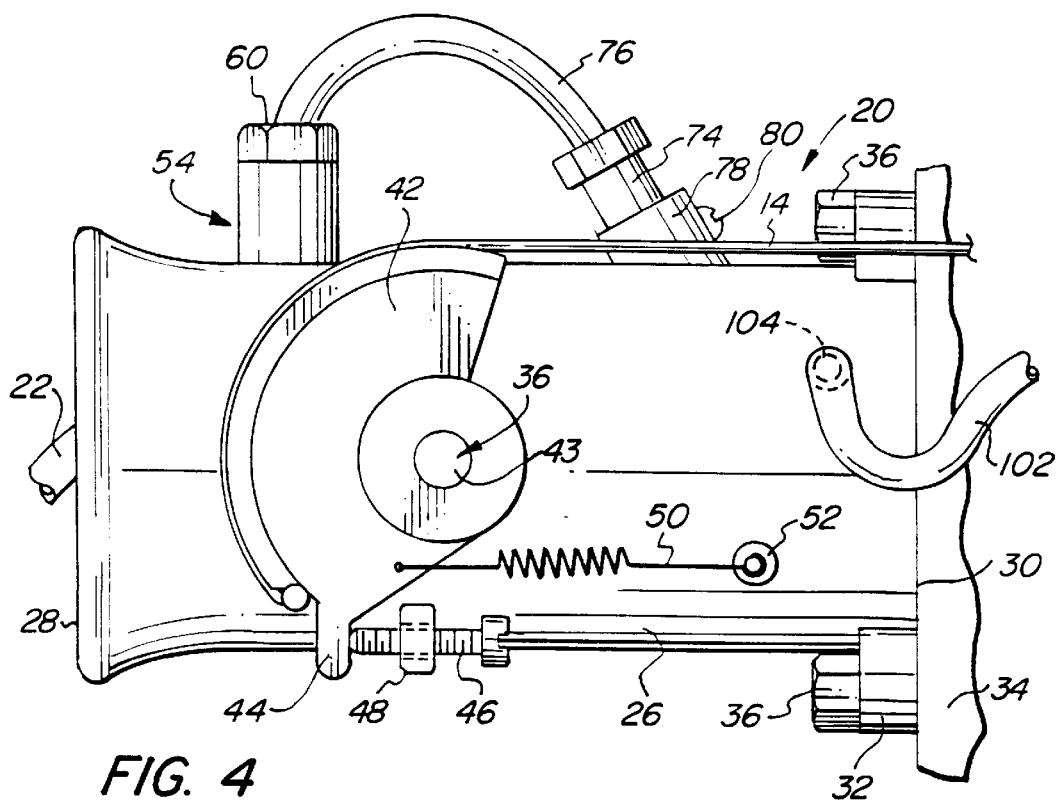
FIG. 4 is a side elevational view of the throttle assembly.

Referring first to FIGS. 1–2, the present invention provides a gaseous fuel injection system 10 for use as part of an improved internal combustion engine 12. The gaseous fuel injection system 10 allows the internal combustion engine 12 to operate on a gaseous fuel such as natural gas or butane, for example, and is a direct replacement for a gasoline carburetor controlled by a throttle cable 14.

The gaseous fuel injection system 10 includes a supply tank 16 connected to a pressure regulator 18, which is in turn connected to a throttle assembly 20 by a fuel line 22, which is controlled by a safety valve 24.

The throttle assembly 20 includes a generally elongated, tubular throttle body 26 having opposing open ends 28,30, with one of the opposing open ends 30 having a base 32 securable to an intake manifold 34 of the engine 12 with bolts 36. A rotatable control rod 38 extends transversely through the throttle body 26, and an air intake valve 40 is secured to the control rod 38 within the throttle body. By rotating the control rod 38, the air intake valve 40 is also rotated to open or close the throttle body 26 for controlling air intake through the throttle body into the intake manifold 34 of the engine 12.

A throttle wheel 42 is secured to a first end 43 of the control rod 38 extending out of the throttle body 26, whereby rotating the throttle wheel rotates the control rod. An idle tab 44 extends from the throttle wheel 42 and abuts an adjustable idle screw 46 extending through a nut 48, which is welded or otherwise secured to an outer surface of the throttle body 26. A return spring 50 is attached to a boss 52 extending from the throttle body 26 and to the throttle wheel 42, biasing the throttle wheel against the idle screw 46. The idle screw 46 is adjusted so that the air intake valve 40 is slightly open when the throttle wheel 42 is biased against the idle screw, to provide a correct idle speed air intake.

A fuel valve 54 is secured to the outer surface of the throttle body 26 with a weld, for example, and includes a valve body 56 defining a fuel inlet 58 connected to the fuel line 22, and a fuel outlet 60. A needle 62 is positioned within the valve body 56 and has a tapered end 64 positioned in the fuel outlet 60 and an exposed end 66 extending out of the valve body. The needle 62 also has a guide 68 defining a plurality of fuel flow slots 70 for allowing fuel passage, and a compression spring 72 pushes against the guide so that, normally, the tapered end 64 of the needle 62 closes the fuel outlet 60.

A fuel injector 74 is connected to the fuel outlet 60 of the fuel valve 54 by an injection line 76, and the fuel injector adjustably extends into the throttle body 26 below the air intake valve 40 through a mounting boss 78 and is secured with a set screw 80. A control arm 82 has a first end pivotally secured to the outer surface of the throttle body 26 with a screw 86. The exposed end 66 of the needle 62 is threaded and a second end 88 of the control arm 82 is adjustably attached to the exposed end with two calibrating nuts 90.

A cam 92 is adjustably secured to a second end 94 of the control rod 38 extending out of the throttle body 26 with a set screw 96. The cam 92 has a working surface 98 in contact with the control arm 82 so that, when the control rod 38 is rotated to open the air intake valve 40, the cam also rotates to push the control arm away from the valve body 56 and gradually pull the tapered end 64 of the biased needle 62 out of the fuel outlet 60 of the valve body to allow fuel to pass to the fuel injector 74.

The throttle cable 14 is secured to the throttle wheel 42, so that pulling the throttle cable rotates the throttle wheel away from the idle screw 46 and rotates the control rod 38 so that the air intake valve 40 opens the throttle body 26 and the cam 92 opens the fuel valve 54. Whereby the throttle cable 14 directly controls both air intake and fuel flow to the intake manifold 34 of the engine 12. Upon release of the throttle cable 14, the return spring 50 returns the throttle wheel 42 to an idle position abutting the idle screw 46, whereby the air intake valve 40 and the fuel valve 54 are held slightly open at an appropriate idle flow rate.

The safety valve 24 bisects the fuel line 22 and prevents fuel flow between the pressure regulator 18 and the inlet 58 of the fuel valve 54 of the throttle assembly 20 when the combustion engine 12 is not operating. A vacuum chamber 100 of the safety valve 24 is connected to a vacuum hose 102 connected to a vacuum port 104 of the throttle body 26 of the throttle assembly 20 between the air intake valve 40 and the intake manifold 34 of the engine 12. The safety valve 24 also includes a fuel flow chamber 106 having an entrance 108 connected to the fuel line 22 from the pressure regulator 18 and an exit 110 connected to the fuel line 22 leading to the throttle assembly 20. A flexible diaphragm 112 separates the vacuum chamber 100 from the fuel flow chamber 106, and a plug 114 is secured to the diaphragm. A compression spring 116 in the vacuum chamber 100 biases the plug 114 against the exit 110 to normally prevent fuel flow. However, when a vacuum is created in the throttle body 26 of the throttle assembly 20 by operation of the engine 12, a vacuum is in turn created in the vacuum chamber 100 through the vacuum hose 102 so that the diaphragm 112 is sucked into the vacuum chamber. The diaphragm 112 sucked into the vacuum chamber 100 pulls the plug 114 off the exit 110 to allow fuel to pass from the pressure regulator 18 to the throttle assembly 20.

The safety valve 24 additionally includes a fulcrumed starting lever 118, connected to the plug 114 by a shaft 120, for pulling the plug off the exit 110 to allow fuel to pass from the pressure regulator 18 to the throttle assembly 20 regardless of whether the engine 12 is operating. An operator of the engine 12 depresses the starting lever 118 in order to allow fuel flow to start the engine. In addition, the operator can pull up on the starting lever 118 to shut off fuel flow, and stop the engine 12. It should be noted that the fulcrumed starting lever 118 can be replaced by other mechanical, hydraulic or electronic controlling means, for example, especially to provide remote control to an operator.

During operation, a gas valve 122 at the supply tank 16, which also includes a gauge 124 to monitor the fuel level, is opened to allow fuel flow through the pressure regulator 18. Then the safety valve 24 is opened by pressing the fulcrumed starting lever 118 to allow fuel to flow to the fuel valve 54 of the throttle assembly 20. With the throttle wheel 42 in the idle position, fuel and air enter the intake manifold 34 of the engine 12 through the throttle body 26, and the throttle cable 14 can be pulled to provide a greater flow of air and fuel to ensure the engine starting. Once the engine 12 is running and a vacuum created in the safety valve 24, the operator can release the starting lever 118.

It should be noted that the cam 92 can be adjusted on the control rod 38 with the set screw 96, the position of the fuel injector 74 can be adjusted with the set screw 80, and the needle 62 of the fuel valve 54 can be adjusted with the calibrating nuts 90 for maximum stoichiometric, emissions and performance balance. By setting these adjustments, a perfect balance can be accomplished for all types of gaseous fuels. In addition to natural gas, therefore, the system 10 can accommodate butane gas contained in the standard butane cylinder commercially known as BERNZOMATIC, for example.

The present invention, therefore, provides an improved gaseous fuel injection system 10 that allows for an improved internal combustion engine 12. The gaseous fuel injection system 10 is a direct replacement for a gasoline carburetor, accommodating a throttle cable 14 normally connected to the gasoline carburetor, and allowing the throttle cable to directly control both air and fuel intake into the engine 12.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A gaseous fuel throttle assembly for use as part of a combustion engine having an intake manifold, the throttle assembly comprising:

a generally tubular throttle body having two open ends with one of the open ends securable to the intake manifold;

a rotatable control rod extending transversely through the throttle body having a first end and a second end extending out of the throttle body;

an air intake valve being secured to the control rod within the throttle body for controlling air intake through the throttle body and into the intake manifold;

a fuel injector extending into the throttle body for controlling gaseous fuel flow into the intake manifold;

a fuel valve being controlled by the second end of the control rod extending out of the throttle body for controlling gaseous fuel flow to the fuel injector;

a throttle wheel controlling both the air intake valve and the fuel valve and adapted to receive a throttle cable, the throttle wheel being secured to the first end of the control rod extending out of the throttle body;

whereby the throttle cable directly controls both air intake and gaseous fuel flow into the intake manifold of the engine.

2. A throttle assembly according to claim 1 further comprising:

a backstop secured to the outer surface of the throttle body with the throttle wheel biased against the backstop, the throttle wheel secured to the control rod so that the air intake valve substantially closes the throttle body when the throttle wheel is biased against the backstop.

3. A throttle assembly according to claim 1 further comprising the throttle cable secured to the throttle wheel.

4. A throttle assembly according to claim 1 wherein the fuel valve comprises:

a valve body defining a fuel inlet for connection to a fuel line and a fuel outlet connected to the fuel injector; and, a needle positioned within the valve body, the needle having a tapered end biased into and closing the fuel outlet and an exposed end extending out of the valve body.

5. A gaseous fuel throttle assembly according to claim 4 wherein the throttle assembly further comprises:

a control arm having a first end pivotally secured to an outer surface of the throttle body and a second end attached to the exposed end of the needle; and, a cam secured to the second end of the control rod, the cam in contact with the control arm whereby, when the control rod is rotated to open the air intake valve, the cam will also rotate to push the control arm away from the fuel valve and gradually pull the tapered end of the biased needle out of the fuel outlet of the valve body to allow gaseous fuel to pass to the fuel injector.

6. A gaseous fuel throttle assembly according to claim 1 wherein the throttle assembly further comprises:

a control arm having a first end pivotally secured to an outer surface of the throttle body and a second end operably attached to the fuel valve; and, a cam secured to the second end of the control rod, the cam in contact with the control arm whereby, when the control rod is rotated to open the air intake valve, the cam will also rotate to push the control arm away from the fuel valve permitting control thereof.

7. A gaseous fuel injection system for use with a combustion engine having an intake manifold, the system comprising:

a) a supply tank for holding compressed gaseous fuel;

b) a pressure regulator for regulating the pressure of the gaseous fuel from the supply tank;

c) a throttle assembly comprising, a generally elongated, tubular throttle body having opposing open ends, with one of the opposing open ends securable to the intake manifold of the engine, an air intake valve controlling air intake through the throttle body and into the intake manifold of the engine, a fuel valve for controlling gaseous fuel flow from the pressure regulator into the throttle body, and, a throttle wheel controlling both the air intake valve and the fuel valve and adapted to receive a throttle cable, whereby the throttle cable will directly control both air intake and gaseous fuel flow into the intake manifold of the engine; and, d) a safety valve including:

a vacuum chamber connected to a vacuum hose extending into the throttle body of the throttle assembly between the air intake valve and the intake manifold of the engine;

a fuel flow chamber having an entrance connected to the pressure regulator and an exit connected to the fuel valve of the throttle assembly;

a flexible diaphragm separating the vacuum chamber from the fuel flow chamber; and, a plug secured to the diaphragm and biased against the exit to normally prevent fuel flow except when a vacuum created in the throttle body of the throttle assembly creates a vacuum, through the vacuum hose, in the vacuum chamber so that the diaphragm is sucked into the vacuum chamber, pulling the plug off the exit to allow fuel to pass from the pressure regulator to the fuel valve of the throttle assembly.

8. A gaseous fuel injection system according to claim 7 wherein the safety valve further includes a starting lever for pulling the plug off the exit to allow fuel to pass from the pressure regulator to the fuel valve.

9. A gaseous fuel injection system according to claim 7 wherein:

the air intake valve of the throttle assembly is positioned within the throttle body for controlling air intake through the throttle body and into the intake manifold of the engine;

a fuel injector extends into the throttle body; and the fuel valve controls fuel flow to the fuel injector.

10. A gaseous fuel injection system according to claim 9 wherein the throttle assembly further comprises:

a rotatable control rod extending transversely through the throttle body;

the throttle wheel secured to a first end of the control rod extending out of the throttle body;

the air intake valve secured to the control rod within the throttle body; and a second end of the control rod extending out of the throttle body controlling the fuel valve.

11. A gaseous fuel injection system according to claim 10 wherein the fuel valve of the throttle assembly includes, a valve body defining a fuel inlet connected to the fuel regulator and a fuel outlet connected to the fuel injector, a needle positioned within the valve body, the needle having a tapered end biased into and closing the fuel outlet and an exposed end extending out of the valve body, the throttle assembly further comprising:

a control arm having a first end pivotally secured to an outer surface of the throttle body and a second end attached to the exposed end of the needle; and a cam secured to the second end of the control rod, the cam in contact with the control arm whereby, when the control rod is rotated to open the air intake valve, the cam will also rotate to push the control arm away from the valve body and gradually pull the tapered end of the biased needle out of the fuel outlet of the valve body to allow gaseous fuel to pass to the fuel injector.

12. A gaseous fuel injection system according to claim 7 wherein the throttle assembly further comprises the throttle cable secured to the throttle wheel.

13. An improved gaseous fueled internal combustion engine having an intake manifold and a throttle cable controllable by an operator of the engine, the improvement comprising a gaseous fuel injection system including:

a) a supply tank for holding compressed gaseous fuel;

b) a pressure regulator for regulating the pressure of the compressed gaseous fuel from the supply tank;

c) a throttle assembly including, a generally tubular throttle body having two open ends with one of the open ends securable to the intake manifold;

a rotatable control rod extending transversely through the throttle body having a first end and a second end extending out of the throttle body;

an air intake valve being secured to the control rod within the throttle body for controlling air intake through the throttle body and into the intake manifold;

a fuel injector extending into the throttle body for controlling gaseous fuel flow into the intake manifold;

a fuel valve and being controlled by the second end of the control rod extending out of the throttle body for controlling gaseous fuel flow to the fuel injector;

a throttle wheel controlling both the air intake valve and the fuel valve and adapted to receive a throttle cable, the throttle wheel being secured to the first end of the control rod extending out of the throttle body;

whereby the throttle cable directly controls both air intake and gaseous fuel flow into the intake manifold of the engine.

14. An improved gaseous fueled combustion engine according to claim 13 wherein the gaseous fuel injection system further comprises a safety valve preventing gaseous fuel flow between the pressure regulator and the fuel valve of the throttle assembly when the combustion engine is not operating.

15. An improved gaseous fueled combustion engine according to claim 13 wherein the fuel valve of the throttle assembly includes,
- a valve body defining a fuel inlet connected to the pressure regulator and a fuel outlet connected to the fuel injector,
- a needle positioned within the valve body, the needle having a tapered end biased into and closing the fuel outlet and an exposed end extending out of the valve body, the throttle assembly further comprising:
- a control arm having a first end pivotally secured to an outer surface of the throttle body and a second end attached to the exposed end of the needle; and
- a cam secured to the second end of the control rod, the cam in contact with the control arm whereby, when the control rod is rotated to open the air intake valve, the cam will also rotate to push the control arm away from the valve body and gradually pull the tapered end of the biased needle out of the fuel outlet of the valve body to allow gaseous fuel to pass to the fuel injector.

* * * * *